United States Patent
Oron et al.

(10) Patent No.: US 8,368,873 B2
(45) Date of Patent: Feb. 5, 2013

(54) PROXIMITY TO TARGET DETECTION SYSTEM AND METHOD

(75) Inventors: Moshe Oron, Rehovot (IL); Vladislav Palatnik, Shomron (IL)

(73) Assignee: Israel Aerospace Industries Ltd., Ben Gurion International Airport (IL)

( * ) Notice: Subject to any disclaimer, the term of this patent is extended or adjusted under 35 U.S.C. 154(b) by 323 days.

(21) Appl. No.: 12/744,535

(22) PCT Filed: Nov. 23, 2008

(86) PCT No.: PCT/IL2008/001533
§ 371 (c)(1),
(2), (4) Date: May 25, 2010

(87) PCT Pub. No.: WO2009/069121
PCT Pub. Date: Jun. 4, 2009

(65) Prior Publication Data
US 2010/0229748 A1    Sep. 16, 2010

(30) Foreign Application Priority Data
Nov. 26, 2007   (IL) .......................................... 187637

(51) Int. Cl.
*G01C 3/08*    (2006.01)
(52) U.S. Cl. ........ 356/3.01; 356/3.1; 356/4.01; 356/4.1; 356/5.01
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | |
|---|---|---|---|
| 4,936,216 A | 6/1990 | Skagerlund | |
| 5,601,024 A * | 2/1997 | Sepp et al. | ..................... 102/213 |
| 6,233,045 B1 * | 5/2001 | Suni et al. | ..................... 356/28.5 |
| 2006/0130696 A1 | 6/2006 | Regev | |
| 2006/0163455 A1 | 7/2006 | Lewin et al. | |
| 2006/0196942 A1 | 9/2006 | Itou et al. | |

FOREIGN PATENT DOCUMENTS

| | | |
|---|---|---|
| DE | 32 38 896 CI | 10/1982 |
| EP | 0 314 646 A2 | 5/1989 |
| FR | 2 458 823 | 1/1981 |
| FR | 2458823 * | 1/1981 |
| GB | 2 395 262 A | 5/2004 |

* cited by examiner

*Primary Examiner* — Luke Ratcliffe
(74) *Attorney, Agent, or Firm* — Oliff & Berridge, PLC

(57) ABSTRACT

There is provided a proximity to a target, detection system, including a laser transmitter for transmitting a beam of radiation at a predetermined wavelength temporal and spatial shape, towards a target from which the proximity is to be determined, a small dimensions body having an opening for admitting radiation reflected from the target, the body housing a receiver for receiving the reflected beam radiation from the target and directing it towards a detector in the body for producing a signal. The detector includes a detection logic circuit allowing detection of reflected radiation for producing an output signal when the body is at a predetermined range from the target and in consideration of the temporal or spatial relative strength of the signal produced by the detected radiation of the reflected beam. A method for detecting the proximity of a body to a radiation-reflecting surface of a target, is also provided.

12 Claims, 3 Drawing Sheets

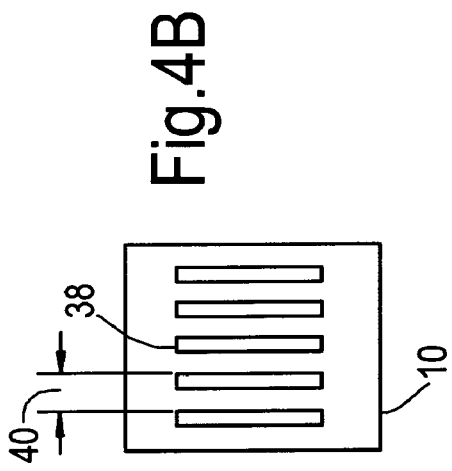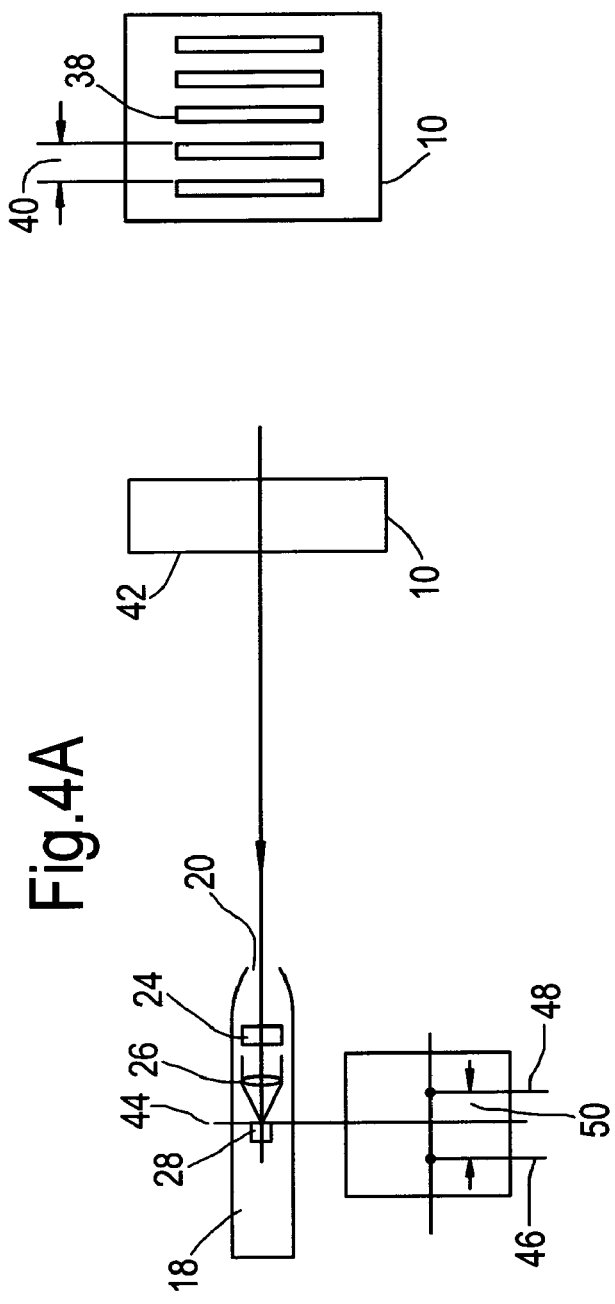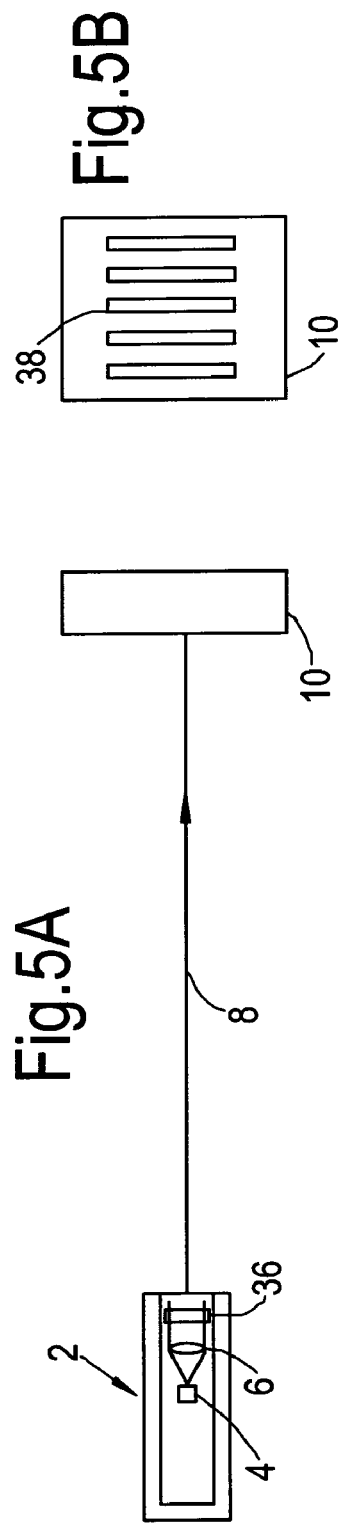

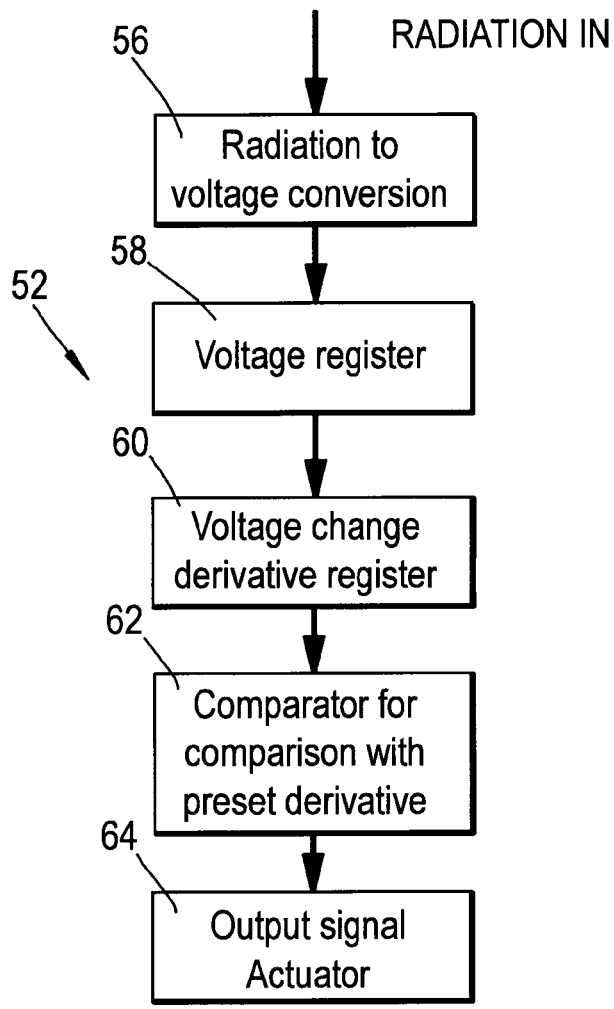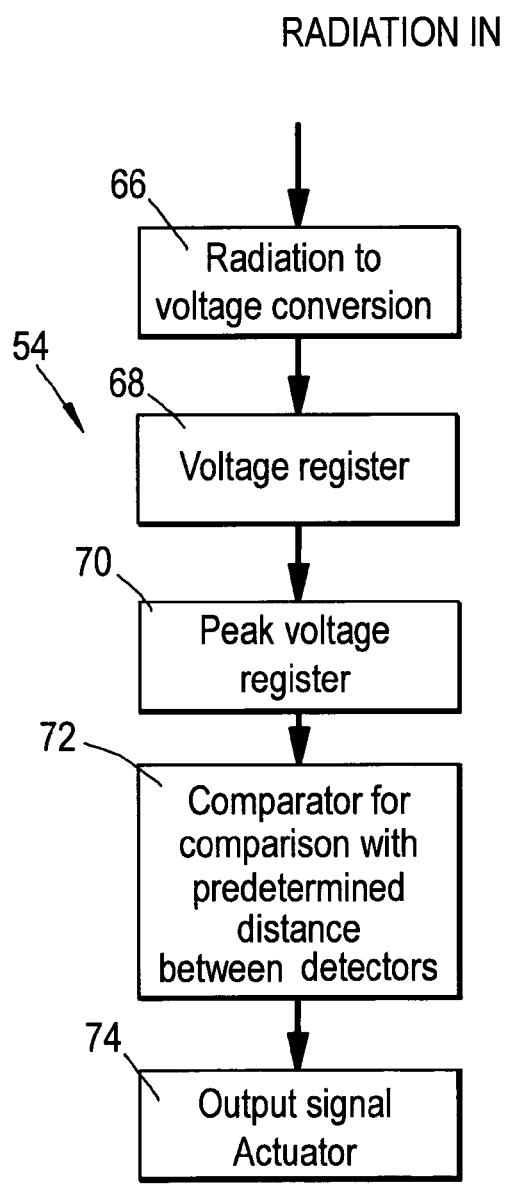

PROXIMITY TO TARGET DETECTION SYSTEM AND METHOD

CROSS-REFERENCE TO RELATED APPLICATIONS

This application is a National Stage application under 35 U.S.C. §371 and claims the benefit under 35 U.S.C. §119(a) of International Application No. PCT/IL2008/001533, having an International Filing Date of Nov. 23, 2008, which claims the benefit of priority of the Israel Application Serial Number 187637, having a filing date of Nov. 26, 2007, all of which are incorporated herein in their entirety.

FIELD OF THE INVENTION

The present invention relates to optical range sensing devices, systems and methods for small size bodies having a small internal volume that cannot accommodate both an optical transmitter and receiver therein. More particularly, the present invention is concerned with a system and method for the detection of the position of a body in proximity to a light-reflecting surface, when the transmitter is external and the receiver is in the body itself such as a projectile, autonomic vehicle or other.

BACKGROUND OF THE INVENTION

The exact positioning of a body such as a projectile or an autonomic vehicle relative to an optically reflecting or partly reflecting surface is of major importance for determining the timing of detonation and for optimizing its performance when actuated.

Common methods for proximity detection utilize optical time of flight range finders, located in a projectile head, where repetitively pulsed laser radiation, emitted from the transmitter, located in the projectile head, impinges on a solid target surface. Travel time is measured by a receiver containing fast detectors located in the projectile head, measuring the reflection time of arrival and calculating the distance. These methods are suitable for distances greater than a few meters, and their accuracy is in the range of about one meter. When the sought-after distances are in the range of tens of centimeters to a few meters, these methods reach their capability limit, requiring a multiplicity of very short pulses having short rise times, thereby the cost of such systems is greatly increased, making this solution expensive and elaborate. The volume required to host the transmitter and receiver, as well as their energy source is large and cannot be placed in very small dimension projectiles, such as bullets, having diameters of 1 to 2 cm and about the same length.

Such bodies are referred to hereinafter as "small size bodies having small internal volume". An optical range detector suitable for small dimension bodies should have the following properties:

1) resolution capability of a range of a few centimeters;
2) the capability to be contained in the body;
3) unaffected by sunlight or stray light;
4) able to operate independently without any communication, wire or wireless, to the body launching station, and
5) have a pre-set range for actuation.

SUMMARY OF THE INVENTION

It is a broad object of the present invention to provide an optical proximity detector unit, system and method for use in small dimension bodies such as projectiles, autonomic vehicles or other bodies having the required properties.

It is a further object of the present invention to provide devices and methods for the detection of the position and distance of a body relative to a solid surface or another reflecting surface in close proximity, namely, in a range of several tens of centimeters to a few meters.

In accordance with the present invention, there is therefore provided a proximity to a target, detection system, comprising a laser transmitter for transmitting a beam of radiation at a predetermined wavelength temporal and spatial shape, towards a target from which the proximity is to be determined, a small dimensions body having an opening for admitting radiation reflected from said target, said body housing a receiver for receiving the reflected beam radiation from the target and directing it towards at least one detector in the body for producing a signal, said detector includes a detection logic circuit allowing detection of reflected radiation for producing an output signal when the body is at a predetermined range from said target and in consideration of the temporal or spatial relative strength of the signal produced by the detected radiation of the reflected beam.

The invention further provides a method for detecting the proximity of a body to a radiation-reflecting surface of a target, comprising providing a proximity detection unit responsive to an external laser transmitter for transmitting a beam of radiation at a predetermined wavelength temporal and spatial shape, towards a target, said unit having at least one receiver for receiving reflected beam radiation from the target and directing it towards at least one detector and a detection logic for producing an output signal, measuring the range between said body and the target, and forming an output signal when the unit is at a predetermined range from said target in consideration of the relative temporal or spatial strength of the signal produced by the detected radiation of the reflected beam.

In accordance with the present invention, there is therefore further provided a proximity detection system, comprising an external laser transmitter, for transmitting a beam of radiation at a predetermined wavelength, spatial and temporal shapes, towards a target; at least one receiver for receiving reflected beam radiation from the target and directing it towards a detector for producing a signal, and detection logic means allowing effective detection of said reflected radiation only when the unit is at a predetermined range from said target, allowing detonation of the projectile at the predetermined range for the generation of one or more of the following materials:

i. lethal spread of particles;
  ii. non-lethal spread of rubber particles;
  iii. paint spread for identification of human targets, and/or
  iv. non-lethal gas spread at the target proximity.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a schematic cross-sectional view of a single external transmitter transmitting an optical beam on a target and a single receiver module inside the body, according to the present invention;

FIG. 1B is a front view of the target illustrated in FIG. 1A;

FIG. 2 is a schematic curve of the signal strength in the detector of the receiver of FIG. 1;

FIG. 3A is a schematic cross-sectional view of another embodiment of a single external transmitter and a single receiver module inside a body, according to the present invention;

FIG. 3B is a front view of the target illustrated in FIG. 3A;

FIG. 4A is the schematic illustration of the spatial signal strength and spatial position in the multiple detectors of FIG. 3A;

FIG. 4B is a front view of the target illustrated in FIG. 4A

FIG. 5A is a schematic cross-sectional view of an external laser transmitter;

FIG. 5B is a front view of the target illustrated in FIG. 4A, and

FIGS. 6A and 6B are block diagrams of the body's receiver detection logics.

DETAILED DESCRIPTION OF PREFERRED EMBODIMENTS

Figure 1A:
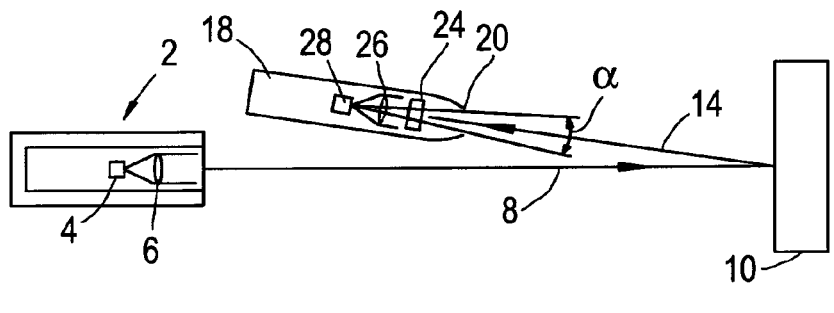
Figure 1B:
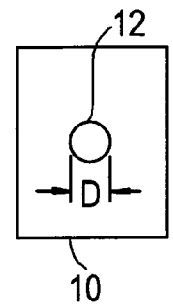
Figure 2:
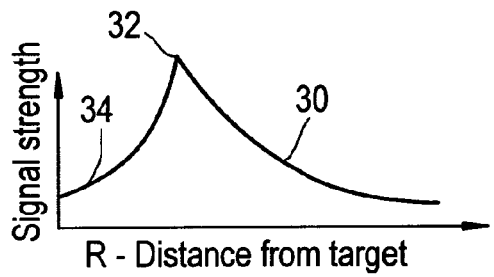

FIGS. 1A and 1B illustrate an external transmitter 2, e.g., a laser transmitter, consisting of, for example, a laser 4, emitting repetitive pulse or modulated radiation of 1060 nm wavelength, via a beam shaping optics 6, e.g., a zoom telescope, which follows a path 8, impinging on a reflecting surface of a target 10, forming on the target 10 a spatial shape of a spot 12, e.g., a circle of a diameter D, e.g., a diameter of 1-20 cm. The reflected radiation follows a path 14 and is received by at least one receiver 16 embedded in the housing of a body 18. The radiation entering the housing of the body 18 through an opening 20, allows the radiation to enter at a wide angle α. After entering, the radiation passes through a narrow band spectral filter 24, e.g., a filter of a few nm of a wavelength, to an optical condenser 26, e.g. a lens, and to a detector 28, e.g., a photodiode. The filter 24 advantageously reduces solar disturbances in the spectral range to which the detector 28 is sensitive. The laser beam reflected from the sport 12 of the target 10 is detected by detector 28, and shows intensity variation of the detected signal according to the light collected by the optics from angle α. The intensity variation has two different regions of target-to-detector-distance that behave differently, as depicted in FIG. 2. At a large distance, where the spot 12 assumes a small part of angle α, the collected light energy is inversely proportional to the distance squared between target 10 and the detector 28. This is depicted in FIG. 2 as region 30. When a distance R between target and detector is selected to be the diameter D of spot 12 divided by the angle α, the spot 12 fills the whole angle α and the amount of collected radiation is at its maximum, depicted at the peak 32 of the curve in FIG. 2. When the distance is shorter, the amount of collected radiation is less and the collection angle α enables only a smaller part of the radiation to be collected, as depicted by curve 34. Detection of the predetermined distance is performed in two ways: a) by measuring the relative intensity as a function time, while moving toward the target 10 and selecting the desired range, at ranges on the far side of curve 34 and, b) by detecting the peak 32 as the determination of the predetermined range. The selection of angle α and the diameter D of spot 12 are the two parameters that define the pre-selected action at a range R. For example, 0.1 radians for the angle α and a spot 12 of a size D=10 cm, will determine a range of R=100 cm. The transmitter 2 spot size D on the target 10 can be reached by the following methods: a) constant diameter due to predetermined minimal beam divergence, b) by a manual zoom lens serving as beam shaping optics 6 and, c) by automatic, motor controlled zoom lens serving as beam shaping optics 6, adjusted according to the range from the transmitter 2 to the target 10, performed by conventional optical ranging techniques.

Figure 3A:
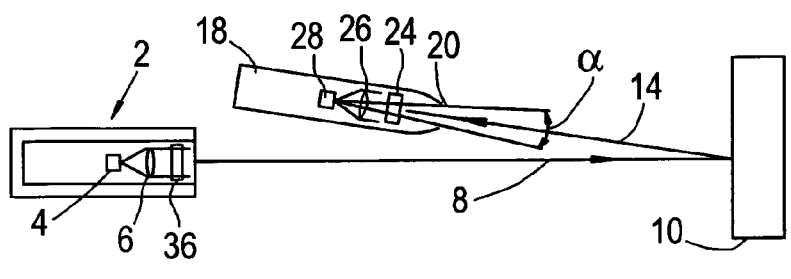
Figure 3B:
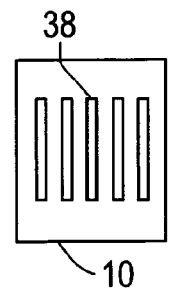

Referring to FIGS. 3A and 3B, there is illustrated an external transmitter 2, a target 10 and a receiver 16, according to the present invention. Radiation, e.g., light emitted from the laser transmitter 4, consisting of, e.g., a repetitive pulse radiation of 1060 nm wavelength, is passed via a beam shaping optics 6, and a radiation generator 36, follows a path 8, impinges on the reflecting surface of target 10, and forms a spatial shape, e.g., a grating-like spatial pattern 38, or any other structured radiation pattern having a negligible divergence at a distance of 300-400 m. The reflected radiation follows a path 14 and is received by the receiver in the housing of body 18. The radiation entering the housing of the body 18 through the opening 20 allows for the entry of radiation at a wide angle α. After entering, the light passes through a narrow band spectral filter 24, e.g., a filter of a few nm of a wavelength, to an optical condenser 26 and to one or more detectors 28, e.g., a pair, or a vector of, photodiodes. The filter 24 advantageously reduces solar disturbances in the spectral range to which the detector 28 is sensitive. The laser beam 14, reflected from the pattern 38 of the target 10, is detected by detector 28, and shows a spatial intensity variation of the signal according to the radiation collected in the opening 20 having a maximal angle α. The intensity variation in the focal plane of condenser 26 exhibits the Fourier transform of the pattern 38 and is described with reference to FIGS. 4A and 4B.

The size of the pattern 38 on the target 10 can be attained by the following methods: a) by a manual zoom lens serving as beam shaping optics 6, and b) by an automatic, motor controlled zoom lens serving as the beam shaping optics 6, adjusted according to the range from the transmitter 2 to the target 10, performed by conventional optical ranging techniques.

Seen in FIGS. 4A and 4B is the pattern 38, e.g., a grating-like illumination having spacings 40. The Fourier transform of plane 42 appears on plane 44 on the detector 28, and, for the example of the grating-like pattern, results in two strong illuminated points 46 and 48, spaced by distance 50. The closer the plane 44 is to plane 42, the smaller the distance 50 between the two points 46 and 48, is. By, e.g., using a pair of detectors at a fixed distance 50, one can actuate the body 18 at a fixed range between planes 44 and 46, when the two detectors obtain a signal. Using a vector of multiple detectors and measuring the location of the peaks of radiation at points 46 and 48 can achieve the same result, as well as being able to preset any range by the selection of the actuating detectors in the vector of multiple detectors.

FIGS. 5A and 5B illustrate the laser transmitter 2 having a CW—Continuous Wave, modulated CW or QCW—Quasi-Continuous Wave pulsed laser 4, that can be any laser, a diode or, e.g., Nd:YAG laser. Laser pulsing or temporal modulation is used for noise reduction. Where an electronic filter, which only passes through the pulsing signals at a rate as determined by the pulser is installed in the detector circuits, background noise is reduced. The radiation passes through a shaping optics 6, e.g., a telescope, determining the light beam diameter and further passes through structured radiation generator 36, e.g., a holographic grating, to target 10, where pattern 38 is created. When, for example, the diameter of the beam is 10 cm, its divergence at a wavelength of 1.06 micrometers is approximately an angle of 10 micro-radians, giving a diffracted beam diameter of 13 cm at a distance of 300 m and a diameter of 14 cm at a distance of 400 m. This difference of 1 cm in diameter is practically negligible and within regular tolerances of detector-to-target of about 8% of the range.

The detector 28 includes one of the two kinds of detection logics: a) a logic circuit 52, allowing effective detection of reflected radiation when the body 18 is at a predetermined range from the target 10 and in consideration of the relative temporal strength of the signal produced by the detected radiation of the reflected beam, and b) a logic circuit 54, allowing effective detection of reflected radiation when the body 18 is at a predetermined range from the target 10 and in consideration of the relative spatial strength of the signal produced by the detected radiation of the reflected beam.

FIG. 6A illustrates a block diagram of detection logic circuit 52 located in the receiver 16, receiving reflected beam radiation from a target and producing a signal in the detector 28. The detection logic circuit 52 enables actuation at a preset range between the body 18 and the target 10.

The detection logic circuit 52 includes a radiation-to-voltage converter 56 feeding corresponding voltage signals to a voltage register 58, a voltage change derivative register 60, a comparator 62 for comparison with a preset derivative, and an output signal actuator 64.

The detection logic circuit 54 includes a radiation-to-voltage converter 66 for feeding corresponding voltage signals in each detector to a voltage register 68, a peak voltage register 70 of each detector, a comparator 72 for comparison with predetermined distance between detectors, and an output signal actuator 74.

The laser transmitter 2, according to the present invention, can be portable, hand-held, or mounted on a firearm, e.g., a rifle, in case body 18 is a projectile, or the like.

The detonation of the projectile need not necessarily be of a type generating explosives, but may just as well generate one of the following materials: a) lethal spread of particles; b) non-lethal spread of rubber particles; c) paint spread for identification of human targets after they leave their position, and/or d) non-lethal gas spread at the target proximity.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A proximity to a target detection system, comprising:
    a laser transmitter for transmitting a beam of radiation at a predetermined wavelength range, the laser transmitter being configured and operable for transmitting the beam towards a target from which the proximity is to be determined, and for applying a predetermined beam shaping to the beam being transmitted for thereby forming on said target an illumination with a predetermined spot like shape having a predetermined diameter to cause a reflected beam of radiation from the target to be indicative of said shape; and
    a body having an opening for admitting the reflected beam from said target,
        said body housing a receiver configured for receiving the reflected beam from the target and directing the reflected beam towards at least one detector in the body,
        said receiver being configured to allow the reflected beam to enter at a predetermined angle;
        said diameter and said angle are configured to obtain a desired variation of an intensity of said reflected beam with respect to a range between said body and said target; and
        said detector including a detection logic circuit allowing detection of the reflected beam, determining the intensity of the reflected beam and producing an output signal indicative of the range from said body to said target based on said intensity.

2. The system according to claim 1, wherein said laser transmitter comprises a beam shaper comprising beam shaping optics for producing a predetermined structured radiation pattern to thereby produce said illumination with the predetermined spot like shape.

3. The system according to claim 1, wherein said laser diameter is attained using beam shaping optics that include a zoom lens.

4. The system according to claim 1, wherein said laser transmitter is separated from said body containing the receiver.

5. The system according to claim 1, wherein said beam has a diameter of between 1 to 20 cm and a negligible divergence at a distance of 1000-2000 m.

6. The system according to claim 1, wherein said receiver includes at least one of the following: beam converging optics and single or multiple detectors at a focal plane of the converging beam; and a filter for blocking radiation which has a wavelength different from a wavelength range for filtering out noise radiation.

7. The system according to claim 1, wherein said detection logic circuit is operable to produce said output signal indicative of the range from said body to said target by measuring said intensity as a function of time while moving towards the target.

8. The system according to claim 1, wherein said detection logic circuit is operable to produce said output signal indicative of the range from said body to said target by detecting a peak of said intensity.

9. A method for detecting a proximity of a body to a radiation-reflecting surface of a target, the method comprising:
    illuminating the target by a laser beam of a predetermined wavelength range, and applying a predetermined beam shaping to said laser beam such that said laser beam interacting with the target has a predetermined spot like shape having a predetermined diameter thereby causing a reflected beam of radiation from the target to be indicative of said shape;
    receiving the reflected beam from the target through an opening of a predefined angle, wherein said diameter and said angle are configured to obtain a desired variation of an intensity of said reflected beam with respect to a range between said body and said target; and
    detecting the reflected beam and processing data indicative thereof by utilizing a detection logic for determining the intensity of the reflected beam and producing an output signal indicative of the range of said body from said target based on said intensity.

10. The method according to claim 9, further comprising detecting a peak of said intensity and producing said output signal in response to the detection of said peak.

11. A proximity to a target detection unit, comprising:
a body having an opening of a predefined angle for admitting a reflected beam of radiation from a target and carrying at least one radiation receiver for receiving the reflected beam from said target,
    said reflected beam having a spot like shape with a predefined diameter, and
    said diameter and said angle are configured to obtain a desired variation of an intensity of said reflected beam with respect to a range between said body and said target, and
    said radiation receiver comprising a detection logic circuit configured and operable for processing data indicative of the reflected beam, determining the intensity of the reflected beam, and producing an output signal indicative of the range from said body to said target based on said intensity.

12. The unit according to claim 11, wherein said detection logic circuit is configured and operable for detonating a projectile at a predetermined range from said target allowing one or more of the following effects: a) lethal spread of particles; b) non-lethal spread of rubber particles; c) paint spread for identification of human targets after they leave their position, and/or d) non-lethal gas spread at the target proximity.

* * * * *